United States Patent [19]

Tanaka et al.

[11] 4,399,174
[45] Aug. 16, 1983

[54] REINFORCING MATERIAL

[75] Inventors: Kazunori Tanaka, Yokosuka; Yukio Nagata, Tokyo; Toshikatu Miura, Tokyo; Yukio Okada, Tokyo, all of Japan

[73] Assignee: Nissan Motor Company, Limited, Yokohama, Japan

[21] Appl. No.: 356,451

[22] Filed: Mar. 9, 1982

[30] Foreign Application Priority Data

Mar. 16, 1981 [JP] Japan .................................. 56-36572

[51] Int. Cl.³ .......................... B32B 1/04; B32B 3/02; B32B 27/08
[52] U.S. Cl. .................................... 428/67; 296/188; 428/156; 428/172; 428/189; 428/192; 428/308.4; 428/319.3; 428/515
[58] Field of Search .................... 428/31, 68, 158–160, 428/304.4, 319.3, 319.7, 515, 172, 192, 189; 293/126, 128; 296/188, 189, 187; 156/298

[56] References Cited

U.S. PATENT DOCUMENTS 3,873,407  3/1975  Kumata et al. .................. 428/319.7

FOREIGN PATENT DOCUMENTS 2061196  5/1981  United Kingdom .

Primary Examiner—Paul J. Thibodeau
Attorney, Agent, or Firm—Lane, Aitken & Kananen

[57] ABSTRACT

A material for reinforcing a panel comprises a strip of expandable material which has not yet expanded, and a sheet of resin material which has not yet hardened. The expandable material is centered onto a central portion of the resin material so that the edges of the resin material are exposed and can be bonded to the panel. One surface of the expandable material is exposed to contact the panel. The exposed surface of the expandable material is flush with the surface of the edges of the resin material.

17 Claims, 10 Drawing Figures

REINFORCING MATERIAL

BACKGROUND OF THE INVENTION

This invention relates to a reinforcing material. A conventional reinforcing structure is shown in FIGS. 1(A), 1(B), and 1(C). A reinforcing member 4 is made of a thermosetting resin augmented with a reinforcing material composed of glass fibers and non-woven fabric. The reinforcing member 4 is affixed to the inner surface of a door outer panel 2 (metallic plate-like member 2a) of a door 1. Thereafter the reinforcing member 4 is hardened by heating.

In FIG. 1, 5 is the door inner panel, 6 is the door window sash, 7 is the side window glass and 8 is the outside door handle.

In the case of such a reinforcing structure, unless the thickness thereof is considerable, the reinforcing effect will be minimal. Hence, the amount of the resin material required to suitably reinforce a large panel would noticeably increase production costs and weight. Also, it is difficult for the reinforcing member to perfectly conform to the shape of the panel to be reinforced, if the reinforcing member is molded and hardened prior to being bonded to the plate-like member.

Even if a reinforcing structure is formed by bonding a reinforcing member of unhardened resin to the panel and thermosetting the same, the thick resin layer will not conform to a curved feature in the panel with small radius of curvature.

In either case, secure adhesion of the reinforcing member and the panel is difficult to achieve.

With the above problems in mind, a reinforced panel for an automobile was proposed. As illustrated in FIGS. 2(A) and 2(B), a thermosetting resinous reinforcing member 11 is made of a tough epoxy resin, for example, augmented with a reinforcing material 10 such as glass fibers. The reinforcing member 11 is bonded directly onto the inner surface 2a of a metallic panel 2 serving as a door outer panel, or on a coating film 9 plated onto said inner surface in advance for rust proofing.

A reinforcing rib 13 is formed by sandwiching a lightweight, rigid member 12 between the inner surface of the panel 2 and the thermosetting-resinous reinforcing member 11. The light-weight member 12 is made of an expandable material, and is shown before expansion in FIG. 2(A) and after expansion in FIG. 2(B).

As shown in FIG. 3, a reinforcing strip 14 is used to form the reinforcing rib 13. The reinforcing strip is made by laminating a sheet of unhardened resin material 16, such as an unhardened epoxy resin, on a strip of an expandable material 15 which has not yet expanded. Particularly the expandable material 15 is preferably a material which will expand irreversibly in response to heating, such as foamable polyethylene or expandable epoxy. By expanding the reinforcing strip by heating the same, for example, during the coating-drying step of automobile assembly, a bead-like projection 1 is formed.

However, if the expandable material 15 is simply covered with a flat layer of the resin material 16, then a step will be formed as shown in FIG. 3A. That is, the contours of the expandable material 15 will not match the surface of the resin material 16. As a result, when the edges of the resin material 16 are bonded to the panel 2, a gap or gaps will be formed on either side of the expandable material 15 as shown in FIG. 3B. This will prevent perfect adhesion of the resin material 16 to the panel 2. In addition, if the expandable material 15 protrudes from the resin material 16, it will not be convenient to transport the reinforcing material in rolled form or stacked form.

SUMMARY OF THE INVENTION

According to this invention, a reinforcing material includes a resin material and an expandable material arranged to form a flat surface with the expandable material bordered on both sides by the resin material. The expandable material is recessed into the central portion of the resin material, and the edges of the resin material can be bonded to a panel. The surface of the edges of the resin material to be bonded to the panel lies in the same plane as the surface of the expandable material in contact with the panel. No gaps exist between the panel and the reinforcing material. Also, the reinforcing material can be easily applied to the panel due to its improved handling qualities.

Since the reinforcing material according to this invention may be formed in a thin flat sheet, in particular, of rectangular cross-section, it can be easily rolled or stacked so that is can be conveniently transported.

BRIEF DESCRIPTION OF THE DRAWINGS

Figure 1A:
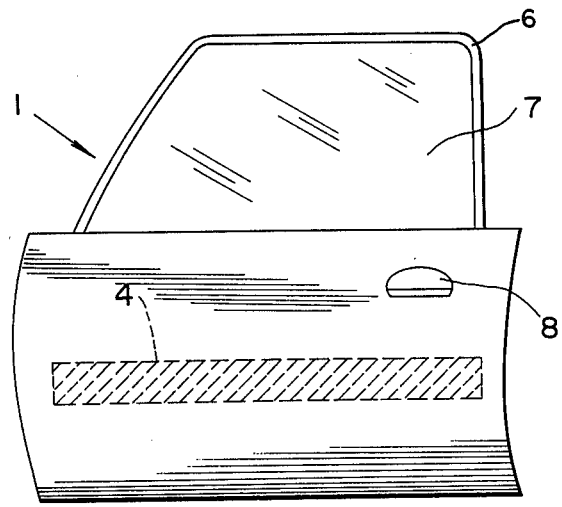
FIG. 1A is a front view of a prior art automobile door with a conventional reinforcing member.
Figure 1B:
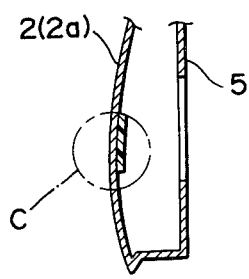
FIG. 1B is a cross-sectional view of a portion of the automobile door shown in FIG. 1A.
Figure 1C:
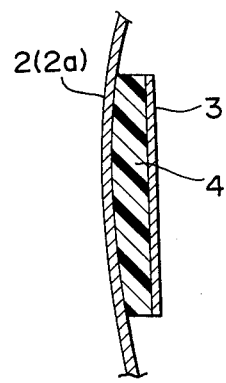
FIG. 1C is a cross-sectional view of the encircled portion labeled by the character C, of the door and reinforcing member shown in FIG. 1B.
Figure 2A:
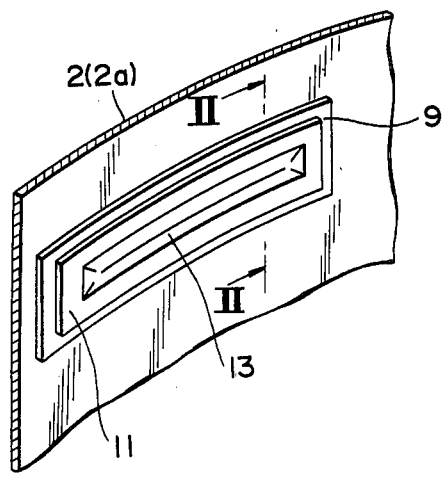
FIG. 2A is a perspective view of a portion of another prior art automobile door in which a conventional reinforcing member is used.
Figure 2B:
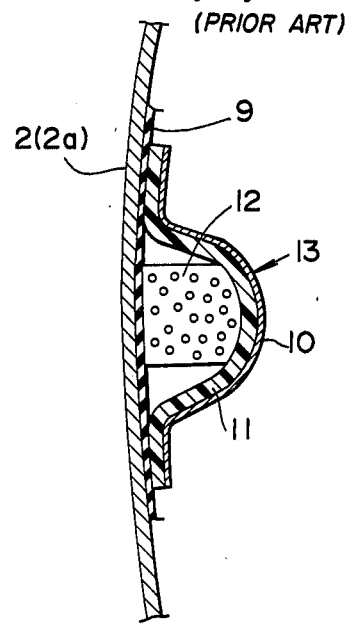
FIG. 2B is a cross-sectional view of the door and reinforcing member shown in FIG. 2A.
Figure 3A:
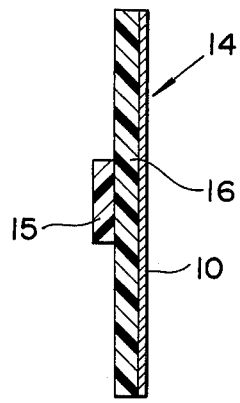
FIG. 3(A) is a cross-sectional view of a conventional reinforcing material before expansion.
Figure 3B:
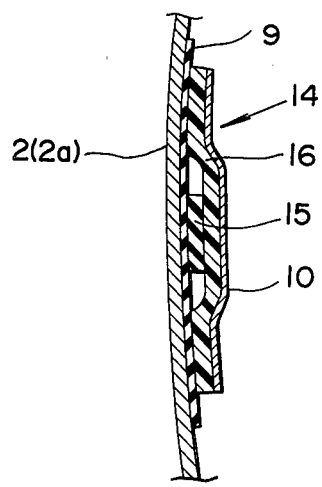
FIG. 3(B) shows the reinforcing material of FIG. 3(A) as applied to a panel.
Figure 4:
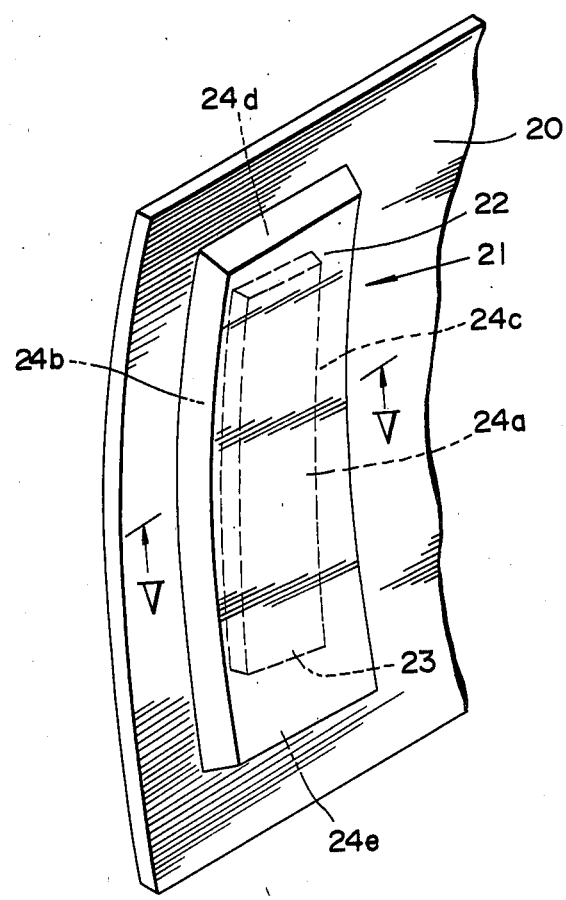
FIG. 4 is a perspective view of an embodiment of this invention.
Figure 5:
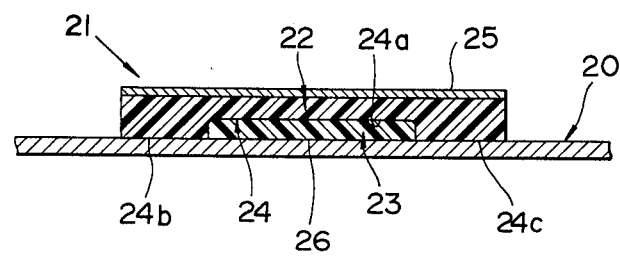
FIG. 5 is a cross-sectional view taken along the line V—V in FIG. 4.

Referring now to FIGS. 4 and 5, the panel 20 might be used as an automobile door outer panel. A reinforcing material 21 is attached to the panel 20 for the purpose of reinforcing the panel 20. The reinforcing material 21 is composed of a sheet of unhardened resin material 22 and a strip of expandable material 23 which has not yet been heat treated.

The resin material 22 is preferably a thermosetting epoxy resin sheet. It should be noted that the resin material 22 is not limited to such a resin. For instance, the resin material may be any resin if it can harden during the coating-drying step for a vehicle body in a drying furnace at a temperature of 120°–180° C. The resin material is preferably flexible before heat treating and is adhesive at room temperature. Thus, it can be melamine-, phenol-, or urea-type resins. If such a resin material itself is not sufficiently asdhesive to stick to the panel, then adhesive material can be additionally used to ensure adhesion to the panel.

A reinforcing material 25 may be added in advance to the surface of the resin material 22. The reinforcing material 25 is preferably a glass cloth but is not limited thereto. For instance, the reinforcing material 25 may be glass fibers, non-woven glass cloth, carbon fibers, non-woven polyester cloth, non-woven polypropylene cloth, kraft paper or the like.

The reinforcing material 25 can be added in any form. It can cover the surface of the resin material 22 or be embedded therein.

The expandable material 23 is preferably an expandable epoxy resin sheet but is not limited thereto. For instance, the expandable material 23 may be any expandable or foamable resin that forms hardenable gas cells prior to the hardening of the resin material 22 at a temperature of 120°–180° C. during a coating-bonding step of automobile vehicle assembly so that it expands in volume to a predetermined degree. The expandable material 23 should be light and be heat-proof at the coating-bonding temperature. Its resiliency, hardness, and other material properties may be disregarded.

The reinforcing material 21, which includes the resin material 22 and the expandable material 23, is formed into a thin sheet. The central portion 24a of the resin material 22 is centered over the expandable material 23 to cover completely the expandable material 23. The edges 24 (side edges 24b, 24c, upper and lower edges 24d, 24e) of the resin material 22 are bonded to the panel 20. The edges 24 of the resin material 22 are thicker than the central portion 24a thereof by the thickness of the expandable material 23. In other words, a recess matching the expandable material 23 is formed in one surface of the resin material 22 so that the surface 26 of the expandable material 23 will be flush with the surface of the edges 24 of the resin material 22 when the expandable material 23 is set in the recess. As shown in FIG. 5, the surfaces of the resin material 22 and the expandable material 23 which contact the panel 20 lie in the same plane so that those surfaces are flat before the reinforcing material 21 is attached to the panel 20. Also, no space or gap exists between the resin material 22 and the panel 20 so that the edges can properly adhere to the panel 20.

For such a reason, it is easy and convenient to attach the reinforcing material 21 to the panel 20. The reinforcing material 21 can be easily rolled or stacked for storage.

It is preferable that the thickness of the reinforcing material 21 be about 2 mm from the standpoint of easy attachment of the reinforcing material 21 to the panel 20. If the reinforcing material 21 is unreasonably thick, it will not conform to an irregularly-shaped panel.

Figure 6:
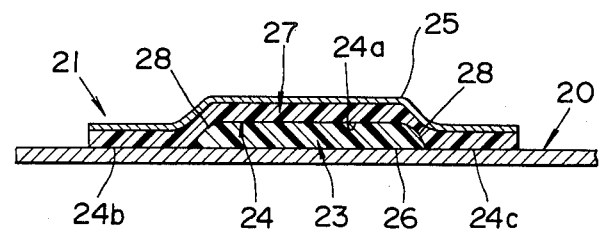
FIG. 6 is a cross-sectional view of another embodiment of this invention, corresponding to FIG. 5.

FIG. 6 shows another embodiment of this invention. In this embodiment, the resin material 22 has substantially the same thickness and is in advance curved so as to correspond to the shape of the foamable material 23 and the panel 20 before the reinforcing material 21 is attached to the panel 20. The surface of the edges 24 of the resin material 22 to be bonded to the panel 20 is flush with the surface 26 of the expandable material 23. The central portion 24a of the resin material 22 is molded in advance to have a recess corresponding to the shape of the expandable material 23. In particular, the edges 28 of the expandable material 23 should precisely correspond to the boundary of the recess formed in the resin material 22. Preferably, the edges 28 thereof should be inclined.

In this second embodiment, no gaps exist between the panel 20 and the resin material 22 when the reinforcing material 21 is properly attached to the panel 20.

What is claimed is:

1. A material for reinforcing a panel comprising:
   a strip of expandable material which has not yet expanded;
   a sheet of thermosetting resin material which has not yet hardened;
   the expandable material being affixed to a central portion of the resin material so that the edges of the resin material are exposed;
   one surface of the expandable material being exposed to contact the panel;
   the central portion of the resin material being formed with a recess corresponding to the shape of the expandable material;
   the expandable material being housed within the recess so that the surfaces of the expandable material and the resin material which contact the panel are sufficiently flat so that no gaps exist between the resin material and the panel when applied to the panel before expanding the expandable material.

2. The reinforcing material of claim 1, wherein the edges of the resin material are thicker than the central portion thereof by the thickness of the expandable material so that the surfaces of the reinforcing material parallel to the panel are flat.

3. The reinforcing material of claim 2, wherein the reinforcing material is rectangular in cross-section.

4. The reinforcing material of claim 1, wherein the resin material is of constant thickness and is bent to form the recess in which the expandable material is housed.

5. The reinforcing material of claim 2, wherein the panel is an automobile door outer panel.

6. The reinforcing material of claim 2, wherein the resin material is a thermosetting resin which is flexible at room temperature and hardens at a temperature of 120°–180° C.

7. The reinforcing material of claim 6, wherein the resin material is adapted to be directly bonded to the panel.

8. The reinforcing material of claim 6, wherein the resin material is adapted to be bonded to the panel by way of an adhesive material.

9. The reinforcing material of claim 2, wherein the expandable material is a low-density, gas-cell forming resin which expands to a predetermined degree at a temperature of 120°–180° C. prior to the hardening of the resin material and is heat proof at that temperature.

10. The reinforcing material of claim 2, further including a reinforcing material fixed to the outer surface of the resin material.

11. The reinforcing material of claim 4, wherein the panel is an automobile door outer panel.

12. The reinforcing material of claim 4, wherein the resin material is a thermosetting resin which is flexible at room temperature and hardens at a temperature of 120°–180° C.

13. The reinforcing material of claim 4, wherein the resin material is adapted to be directly bonded to the panel.

14. The reinforcing material of claim 6, wherein the resin material is adapted to be bonded to the panel by way of an adhesive material.

15. The reinforcing material of claim 4, wherein the expandable material is a low-density, gas-cell forming resin which expands to a predetermined degree at a temperature of 120°–180° C. prior to the hardening of the resin material and is heat proof at that temperature.

16. The reinforcing material of claim 4 further including a reinforcing material fixed to the outer surface of the resin material.

17. A material for reinforcing a panel comprising:
a strip of expandable material which has not yet expanded;
a sheet of thermosetting resin material which has not yet hardened;
the expandable material being affixed to a central portion of the resin material so that the edges of the resin material are exposed;
one surface of the expandable material being exposed to contact the panel;
the exposed surface of the expandable material being flush with the surface of the edges of the resin material, before the reinforcing material is attached to the panel;
the central portion of the resin material being formed with a recess corresponding to the shape of the expanding material;
the expandable material being housed within the recess so that the surfaces of the expandable material and the resin material which contact the panel are flat;
the edges of the resin material being thicker than the central portion thereof by the thickness of the expandable material so that the surfaces of the reinforcing material parallel to the panel are flat.

* * * * *